T. F. MORSE.
CONVEYER FOR CORN HUSKING MACHINES.
APPLICATION FILED JAN. 14, 1914.

1,112,926.

Patented Oct. 6, 1914.

2 SHEETS—SHEET 1.

Witnesses
A. J. Dimond
F. E. Prochnow

Inventor
Theodore F. Morse,
By Wilhelm Parker
Attorneys

T. F. MORSE.
CONVEYER FOR CORN HUSKING MACHINES.
APPLICATION FILED JAN. 14, 1914.
1,112,926.
Patented Oct. 6, 1914.
2 SHEETS—SHEET 2.
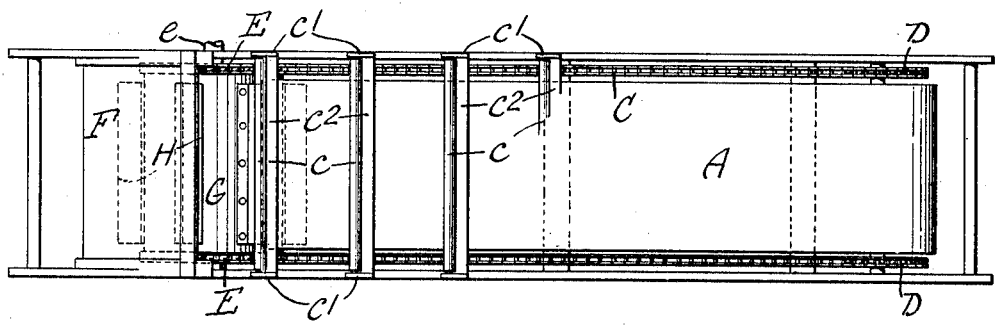
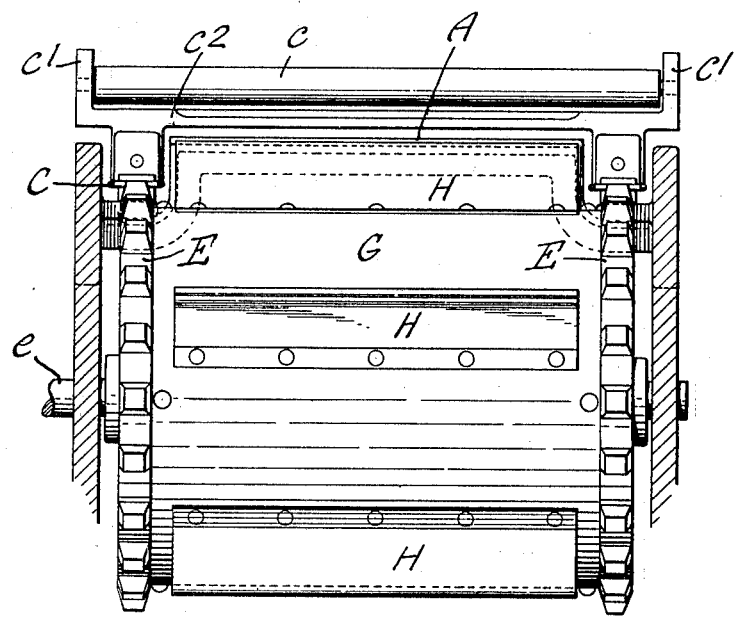

UNITED STATES PATENT OFFICE.

THEODORE F. MORSE, OF SILVER CREEK, NEW YORK.

CONVEYER FOR CORN-HUSKING MACHINES.

1,112,926.  Specification of Letters Patent.  Patented Oct. 6, 1914.

Application filed January 14, 1914. Serial No. 812,120.

*To all whom it may concern:*

Be it known that I, THEODORE F. MORSE, a citizen of the United States, residing at Silver Creek, in the county of Chautauqua and State of New York, have invented a new and useful Improvement in Conveyers for Corn-Husking Machines, of which the following is a specification.

This invention relates more particularly to improvements in green corn husking machines of that kind in which the ears of corn are conveyed from the feed table past the husking rolls by an endless conveyer having transverse flights or rods which shove the ears of corn in advance of them over the feed table and over the husking rolls which are located beneath the lower run of the conveyer. When the cross rods of the conveyer pass beyond the feed table and move downwardly around the supporting wheels for the conveyer, the ears of corn fall from their position against the front side of one cross rod against the rear side of the preceding cross rod and it is possible for an ear to get out of the intended transverse position and be presented to the husking rolls in a position oblique or crosswise thereto so that it will not be properly husked. The ears may also get in between the cross rods and the chains or the wheels of the conveyer and become crushed or stall the machine.

The object of this invention is to provide conveyers of this sort with a drum or wheel which forms pockets or compartments which confine the ears of corn in proper transverse position between the conveyer rods as the same pass around the conveyer wheels, so as to insure of the ears being presented in proper position to the husking rolls, and prevent injury to the ears of corn or the stalling or injuring of the machine.

Figure 1:
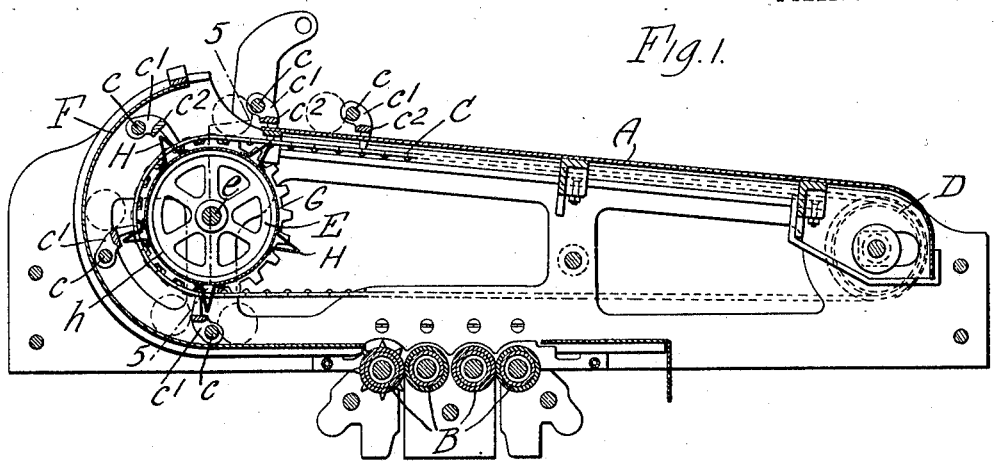
Figure 2:
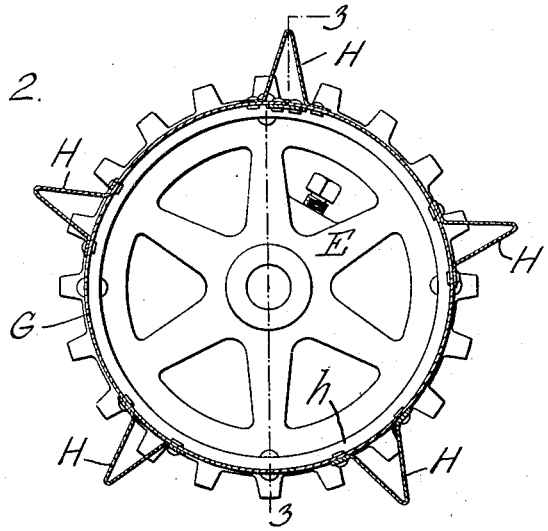
Figure 3:
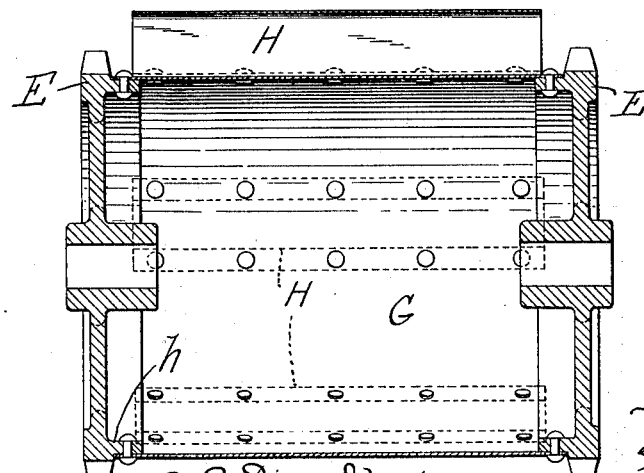

In the accompanying drawings: Figure 1 is a fragmentary longitudinal sectional elevation of a corn husking machine having a conveyer provided with means embodying the invention. Fig. 2 is an enlarged sectional elevation of the compartment drum of the conveyer. Fig. 3 is a section of the compartment wheel in line 3—3, Fig. 2. Fig. 4 is a plan view of the parts shown in Fig. 1. Fig. 5 is a transverse sectional elevation of the conveyer in line 5—5, Fig. 1.

A represents the feed table and B the husking rolls of a machine for husking green corn, and C represents an endless conveyer by which the ears of corn, which are placed on the feed table, are conveyed therefrom to and over the husking rolls, which are located beneath the lower run of the conveyer. These parts are of known construction but will be described sufficiently in detail to enable a proper understanding of their operation and the application thereto of this invention.

The conveyer comprises a pair of endless chains, and rods $c$ which are supported by arms $c'$ projecting outwardly from the chains and extend crosswise between the chains. The chains pass around pairs of wheels D and E located adjacent the opposite ends of the feed table and their upper runs travel forwardly in a plane below the feed table, while the arms $c'$ support the cross rods $c$ above the feed table so that they engage the ears of corn, which are placed on the feed table in front of the cross rods, and move them forwardly on the feed table. The shaft for one pair of conveyer wheels, for instance, the shaft $e$ for the wheels E, is driven to propel the conveyer. The cross rods $c$ of the conveyer are preferably journaled loosely in bearings in the supporting arms $c'$ in which they are free to revolve, and the supporting arms $c'$ are connected by cross bars $c^2$, parallel with the cross rods $c$, which prevent the spreading of the arms and the disengagement of the rods from their bearings. A curved plate F extends downwardly around the wheels E of the conveyer from a point above the same, and extends below the conveyer substantially to the first of the husking rolls B.

The ears of corn are placed on the feed table, one in front of each of the cross rods $c$ of the conveyer, and the rods shove the ears of corn forwardly off of the feed table beneath the upper end of the curved plate F, and as the conveyer passes downwardly around the wheels E the ears of corn fall onto the guard plate and are shoved along the horizontal portion of the same by the conveyer onto the husking rolls. The husking rolls grip and remove the husks from the ears and the husked ears are moved off of the husking rolls and discharged by the lower run of the conveyer. During the travel of the conveyer rods $c$ downwardly around the chain wheels E, the ears of corn will fall from their position in front of each conveyer rod against the rear side of the preceding rod or cross bar of the conveyer and when they reach the lower horizontal portion of the plate F they will again be engaged and shoved along the plate by the conveyer rods. In thus passing around the conveyer wheels E, ears of corn not infrequently get out of the intended transverse position and cause difficulty in one or another form. For example, an ear may be carried in an oblique or endwise position to the husking rolls so that it will not be properly husked; it may lodge on one of the cross bars $c^2$ at the lower side of the wheels E and ride on the bar past the husking rolls, being thus held off of the rolls and prevented from being husked; or it may fall in between the wheels E or the conveyer chains and be crushed or stall the machine. This displacement of the ears of corn from their intended transverse position, with the consequent defects in the operation of the machine, is prevented in accordance with this invention, by arranging between the conveyer wheels E a compartment wheel or drum which turns with the wheels. This drum preferably consists, as shown, of a sheet metal cylindrical body G provided with longitudinal ribs or blades H which extend from end to end of the drum and project outwardly from the surface thereof. These ribs or blades are spaced apart on the drum such a distance that as the cross rods of the conveyer move downwardly around the wheels E they will approximately register with and be located opposite to and outwardly beyond the ribs or blades. The ribs or blades H preferably extend outwardly from the drum into close proximity to the cross bars of the conveyer so as to substantially fill the spaces between these cross bars and the surface of the drum. The drum is preferably secured at its ends to the conveyer wheels E for which purpose, as shown, the wheels are provided at their inner sides with circular flanges $h$ to which the ends of the drum are riveted. The drum and chain wheels are thus rigidly connected and form in effect a single wide wheel or drum having longitudinal blades and provided at its ends with teeth for the engagement of the links of the conveyer chains. The ribs or blades H are preferably formed by V-shaped strips of sheet metal riveted to the cylindrical body of the drum. The drum coöperates with the conveyer to form confining pockets or compartments for the ears of corn between the cross rods of the conveyer as the latter pass downwardly around the conveyer wheels E. The space between the conveyer rods is closed at the inner side by the cylindrical body of the drum. Between the body of the drum and the cross bars of the conveyer, by the ribs or blades H of the drum, and at the outer side by the curved guard plate F. Each ear of corn is therefore confined between two of the cross rods of the conveyer in a closed space and cannot fall in between the conveyer chains or wheels E or project into the spaces which would otherwise be left between the cross bars of the conveyer and the conveyer wheels E. It is, therefore, impossible for small or short ears of corn which might assume an oblique or endwise position between the cross rods of the conveyer to get out of these inclosed spaces, and as the cross rods continue their movement the ears of corn will be sooner or later again moved back into their correct transverse position on the lower portion of the guard plate and will be delivered to the husking rolls in a position parallel with the rolls.

I claim as my invention:

1. The combination of an endless conveyer having projecting flights which advance the articles being conveyed, and a rotary drum around which said conveyer travels and which is provided with projecting blades which approximately register and move with said conveyer flights as the latter pass around the drum, thereby forming containing compartments between said flights for the articles.

2. The combination of an endless conveyer provided with cross rods which advance the articles being conveyed, a rotary drum around which said conveyer travels and which is provided with blades which project outwardly and approximately register and move with said conveyer rods as the latter travel around the drum, thereby forming compartments between said conveyer rods for the articles, and means which retain the articles in said compartments.

3. The combination of a conveyer comprising endless chains and cross rods connecting said chains, a rotary drum around which said conveyer travels and which is provided with blades which project outwardly between the conveyer chains and approximately register and move with said conveyer rods as the latter travel around the drum, thereby forming compartments between said conveyer rods for the articles being conveyed, and a plate which partially surrounds said drum and retains the articles in said compartments.

4. The combination of a conveyer comprising endless chains and cross rods connecting said chains, chain wheels around which said chains pass, a drum which is located between and turns with said chain wheels and is provided with blades which project outwardly between the conveyer chains in proximity to said conveyer rods, and a plate which partially surrounds said drum and coöperates with said drum to form compartments between said conveyer rods in which the articles being conveyed are confined as they pass around said wheels.

5. The combination of a conveyer comprising endless chains and cross rods connecting said chains, chain wheels around which said chains pass, a drum which is secured to and connects said chain wheels and is provided with blades which project outwardly between the conveyer chains in proximity to said conveyer rods, and a plate which partially surrounds said drum and coöperates with said drum to form compartments between said conveyer rods in which the articles being conveyed are confined as they pass around said wheels.

Witness my hand, this 12th day of January, 1914.

THEODORE F. MORSE.

Witnesses:
EDWIN L. COON,
EDWARD J. MACHEMER.

Copies of this patent may be obtained for five cents each, by addressing the "Commissioner of Patents, Washington, D. C."